United States Patent
Fu

(10) Patent No.: US 8,981,962 B2
(45) Date of Patent: Mar. 17, 2015

(54) HOLDER DEVICE CAPABLE OF AUTOMATICALLY ADJUSTING ORIENTATION OF AN ELECTRONIC DEVICE PLACED THEREON, AND ASSEMBLY OF HOLDER DEVICE AND ELECTRONIC DEVICE

(75) Inventor: Chuan-Cheng Fu, Hsichih (TW)

(73) Assignee: Wistron Corporation (TW)

( * ) Notice: Subject to any disclaimer, the term of this patent is extended or adjusted under 35 U.S.C. 154(b) by 300 days.

(21) Appl. No.: 13/366,126

(22) Filed: Feb. 3, 2012

(65) Prior Publication Data

US 2012/0229300 A1     Sep. 13, 2012

(30) Foreign Application Priority Data

Mar. 11, 2011   (TW) .............................. 100108345 A

(51) Int. Cl.
*G08G 1/00*   (2006.01)
*G10L 21/00*   (2013.01)
(Continued)

(52) U.S. Cl.
CPC .......... *B60R 11/02* (2013.01); *B60R 2011/0071* (2013.01); *B60R 2011/0089* (2013.01);
(Continued)

(58) Field of Classification Search
CPC ............ B60R 11/02; B60R 2011/0071; B60R 2011/0089; B60R 2011/0092
USPC .......... 340/576, 901, 439, 575; 704/275, 270; 248/311
See application file for complete search history.

(56) References Cited

U.S. PATENT DOCUMENTS 5,345,538 A  *  9/1994  Narayannan et al. ......... 704/275
6,219,645 B1 *  4/2001  Byers ............................ 704/275
(Continued)

FOREIGN PATENT DOCUMENTS

CN    101090482    12/2007
CN    101714313    5/2010
(Continued)

OTHER PUBLICATIONS

Office action in CN Counterpart Application No. 201110070547.5; Jan. 24, 2014; 20 pages including English language translation of portions within boxes.
(Continued)

*Primary Examiner* — Benjamin C Lee
*Assistant Examiner* — Chico A Foxx
(74) *Attorney, Agent, or Firm* — Hancock Hughey LLP

(57) ABSTRACT

A holder device is capable of automatically adjusting orientation of an electronic device placed thereon based upon position of a user. The holder device includes a holder body, a torque unit, and a control unit. The holder body includes a base, a movable arm set pivoted to the base, and a fastening seat for placing the electronic device thereon. The torque unit is disposed at pivot joints of the movable arm set and provides power for driving pivoting movement of the movable arm set. The control unit is disposed to receive user-associated position information and is configured to generate a control command corresponding to the position information and to transmit the control command to the torque unit so as to control the torque unit to move the movable arm set for adjusting orientation of the electronic device placed on the fastening seat.

13 Claims, 6 Drawing Sheets

(51) Int. Cl.
*B60R 11/02* (2006.01)
*F16M 11/04* (2006.01)
*F16M 11/10* (2006.01)
*F16M 11/14* (2006.01)
*F16M 11/18* (2006.01)
*F16M 11/20* (2006.01)
*F16M 13/02* (2006.01)
*B60R 11/00* (2006.01)

(52) U.S. Cl.
CPC ...... *B60R2011/0092* (2013.01); *F16M 11/041* (2013.01); *F16M 11/10* (2013.01); *F16M 11/14* (2013.01); *F16M 11/18* (2013.01); *F16M 11/2021* (2013.01); *F16M 11/2078* (2013.01); *F16M 13/022* (2013.01)
USPC ........... 340/901; 340/576; 340/439; 340/575; 704/275; 704/270

(56) References Cited

U.S. PATENT DOCUMENTS

| | | | |
|---|---|---|---|
| 7,231,051 B2* | 6/2007 | Paviot et al. | 381/56 |
| 8,081,432 B2 | 12/2011 | Li et al. | |
| 2002/0140562 A1* | 10/2002 | Gutta et al. | 340/576 |
| 2005/0205739 A1* | 9/2005 | DePue et al. | 248/311.2 |
| 2008/0203260 A1* | 8/2008 | Carnevali | 248/316.5 |
| 2009/0084913 A1* | 4/2009 | Grabania et al. | 248/176.3 |
| 2010/0295782 A1* | 11/2010 | Binder | 345/158 |
| 2011/0238213 A1* | 9/2011 | Nagasaka et al. | 700/253 |
| 2013/0317667 A1* | 11/2013 | Kruglick | 701/2 |

FOREIGN PATENT DOCUMENTS

| | | |
|---|---|---|
| JP | 6-141309 | 5/1994 |
| TW | I273051 | 2/2007 |
| TW | I287204 | 9/2007 |

OTHER PUBLICATIONS

Office action in TW Counterpart Application No. 100108345; Sep. 17, 2013; 7 pages including English language translation of portions within boxes.

The Office Action issued to Chinese Counterpart Application No. 201110070547.5 by the State Intellectual Property Office of the P.R.C. on Aug. 12, 2014, along with an English translation of the sections boxed in red.

\* cited by examiner

HOLDER DEVICE CAPABLE OF AUTOMATICALLY ADJUSTING ORIENTATION OF AN ELECTRONIC DEVICE PLACED THEREON, AND ASSEMBLY OF HOLDER DEVICE AND ELECTRONIC DEVICE

CROSS-REFERENCE TO RELATED APPLICATION

This application claims priority of Taiwanese Application No. 100108345, filed on Mar. 11, 2011, the disclosure of which is incorporated here in by reference.

BACKGROUND OF THE INVENTION

1. Field of the Invention

The invention relates to a holder device, more particularly to a holder device that is capable of automatically adjusting orientation of an electronic device placed thereon.

2. Description of the Related Art

As shown in FIG. 1, in order to fix a handheld electronic device 91 in a vehicle, a holder device 92 is required. A conventional holder device 92 is not able to adjust orientation of the electronic device 91 automatically, and requires manually adjusting the position of the holder device 92 when a different orientation is needed. Some holder devices 92 with more advanced configurations provide a rotatable arm 93, which is capable of adjusting orientation of the electronic device 91 placed on the holder device 92 when manually operated by a user.

Nonetheless, the holder device 92 remains still after being adjusted. If the vehicle is to be driven by multiple users (e.g., a married couple), each time a different driver is seated in the driver seat, a corresponding manual adjustment becomes necessary to maintain an optimum viewing angle and distance after seat adjustment due to differences between each driver such as height and driving habits.

Similarly, a display screen hung in a mall is typically mounted in a fixed location and orientation, requiring users to move correspondingly to achieve an optimum viewing angle and distance.

SUMMARY OF THE INVENTION

Therefore, the object of the present invention is to provide a holder device that is capable of automatically adjusting orientation of an electronic device placed thereon through a determination of user position via recognition technique.

Accordingly, a holder device of the present invention is capable of automatically adjusting orientation of an electronic device placed thereon based upon position of a user.

The holder device comprises a holder body, a torque unit, and a control unit.

The holder body includes a base, a movable arm set pivoted to the base, and a fastening seat for placing the electronic device thereon.

The torque unit is disposed at pivot joints of the movable arm set and provides power for driving pivoting movement of the movable arm set.

The control unit is disposed to receive user-associated position information and is configured to generate a control command corresponding to the position information and to transmit the control command to the torque unit so as to control the torque unit to move the movable arm set for adjusting orientation of the electronic device placed on the fastening seat.

The holder device further comprises a detector unit for providing the user-associated position information to the control unit. The detector unit includes an acquisition module, a recognition module connected to the acquisition module, and a computing module connected to the recognition module. The acquisition module is for acquiring user-associated information. The recognition module receives the user-associated information from the acquisition module and recognizes target information conforming to a preset definition from the user-associated information. The computing module is operable to generate the user-associated position information from the target information.

In one embodiment, the detector unit can include an image acquisition module, an image recognition module connected to the image acquisition module, and a computing module connected to the image recognition module. The image acquisition module is for acquiring an original image of the user. The image recognition module receives the original image from the image acquisition module and recognizes a target image conforming to a preset facial definition from the original image. The computing module is operable to generate the user-associated position information from the original image and the target image.

The holder device may further comprise a warning unit connected to the control unit. The computing module of the detector unit recognizes consecutive ones of the target image for comparison with a preset asleep definition. The computing module transmits a warning signal to the control unit upon recognizing from the consecutive ones of the target image that the user has fallen asleep. The control unit transmits a control signal to the warning unit for generating an audible warning in response to the warning signal.

The computing module transmits the warning signal upon identification of any one of the following conditions: frequency of the eyes of the user being closed conforms with a predetermined frequency; instant swaying movement of the head of the user; and the head of the user has moved out of a detection range of the image acquisition module. However, this invention is not limited to the aforementioned conditions.

The detector unit can alternatively include an audio pickup module, a voice recognition module connected to the audio pickup module, and a computing module connected to the voice recognition module. The audio pickup module is for acquiring an original audio signal. The voice recognition module receives the original audio signal from the audio pickup module and recognizes a target voice source from the original audio signal. The computing module is operable to generate the user-associated position information from the original audio signal and the target voice source. In one configuration, the audio pickup module acquires the original audio signal from three different positions, the voice recognition module identifies one of the positions having a comparatively large volume of the original audio signal, and the computing module generates the user-associated position information with reference to the position identified by the voice recognition module. In another configuration, the voice recognition module stores a plurality of command audio files for comparison with the original audio signal from the audio pickup module, and the computing module generates the user-associated position with reference to a comparison result from the voice recognition module.

The movable arm set includes a plurality of movable arms that are pivoted together, and the torque unit includes motors corresponding to the movable arms. The torque unit is configured to receive electricity from an external electric source. The torque unit includes a pulse width modulation (PWM) circuit for receiving the control command and generating PWM signals then transmitting the PWM signals to the motors. The control unit stores a record of adjusted orientation of the electronic device therein, the record indicating a reference point position and motion track information of each of the motors.

In one of the embodiments, the detector unit is disposed at the electronic device and the electronic device includes a wireless transmitting module for transmitting the user-associated position information. The holder device further comprises a wireless receiving module electrically connected to the control unit for receiving the user-associated position information and providing the user-associated position information to the control unit.

In one of the embodiments, the detector unit is disposed at the holder body, and is electrically connected to the control unit.

The fastening seat includes a palm part and a plurality of claw parts. The holder device further comprises a proximity switch disposed at the palm part and electrically connected to the control unit, and a plurality of pressure sensors disposed at the claw parts and electrically connected to the control unit. The torque unit includes servo motors disposed at pivot joints of the claw parts and electrically connected to the control unit. The proximity switch transmits an activating signal to the control unit upon sensing that the electronic device is proximate to the palm part. The control unit responds to the activating signal by activating the servo motors for moving the claw parts toward each other for holding the electronic device. The control unit activates the pressure sensors and deactivates the servo motors to stop further movement of the claw parts when pressure values detected by the pressure sensors reach a preset pressure value.

Another object of the present invention is to provide an assembly of an electronic device and a holder device. The holder device is capable of automatically adjusting orientation of the electronic device placed thereon.

Accordingly, an assembly of the present invention comprises an electronic device and a holder device. The electronic device includes a detector unit and a wireless transmitting module. The detector unit includes an acquisition module, a recognition module connected to the acquisition module, and a computing module connected to the recognition module. The acquisition module is for acquiring user-associated information. The recognition module receives the user-associated information from the acquisition module and recognizes target information conforming to a preset facial definition from the user-associated information. The computing module is operable to generate user-associated position information from the target information. The wireless transmitting module wirelessly transmits the user-associated position information. The holder device is capable of automatically adjusting orientation of the electronic device placed thereon based upon position of a user. The holder device includes a holder body, a torque unit, a wireless receiving module, and a control unit. The holder body includes a base, a movable arm set pivoted to the base, and a fastening seat for placing the electronic device thereon. The torque unit is disposed at pivot joints of the movable arm set and provides power for driving pivoting movement of the movable arm set. The wireless receiving module is for wirelessly receiving the user-associated position information. The control unit is disposed to receive the user-associated position information from the wireless receiving module and is configured to generate a control command corresponding to the user-associated position information and to transmit the control command to the torque unit so as to control the torque unit to move the movable arm set for adjusting orientation of the electronic device placed on the fastening seat to correspond to the user-associated position information.

The effect of the invention is that by utilizing a detecting technique and controlling the torque unit to move the movable arm set, the orientation of the electronic device on the holder device can be adjusted automatically.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
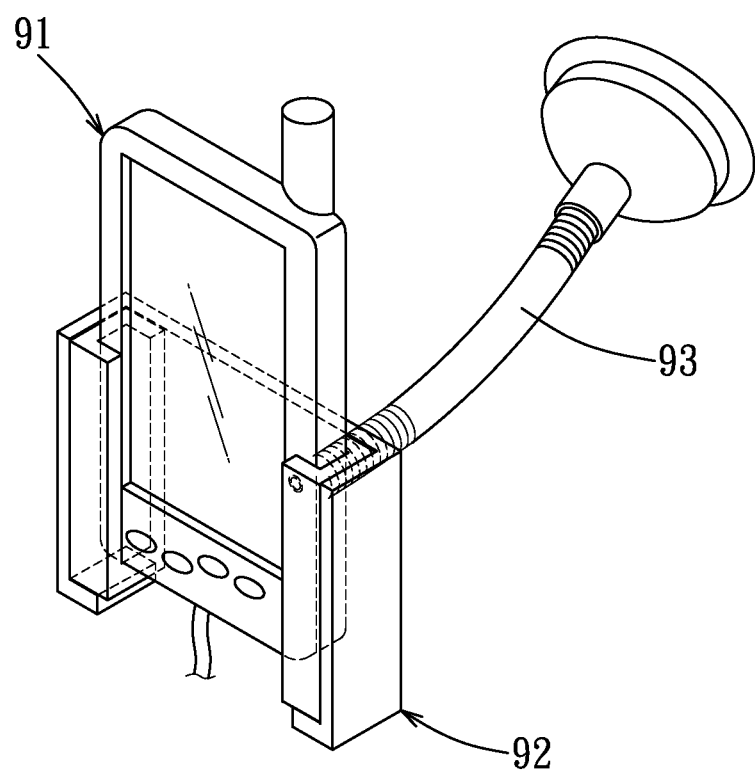
FIG. 1 is a perspective view illustrating a conventional holder device.

Before the present invention is described in greater detail, it should be noted that like elements are denoted by the same reference numerals throughout the disclosure.

Figure 2:
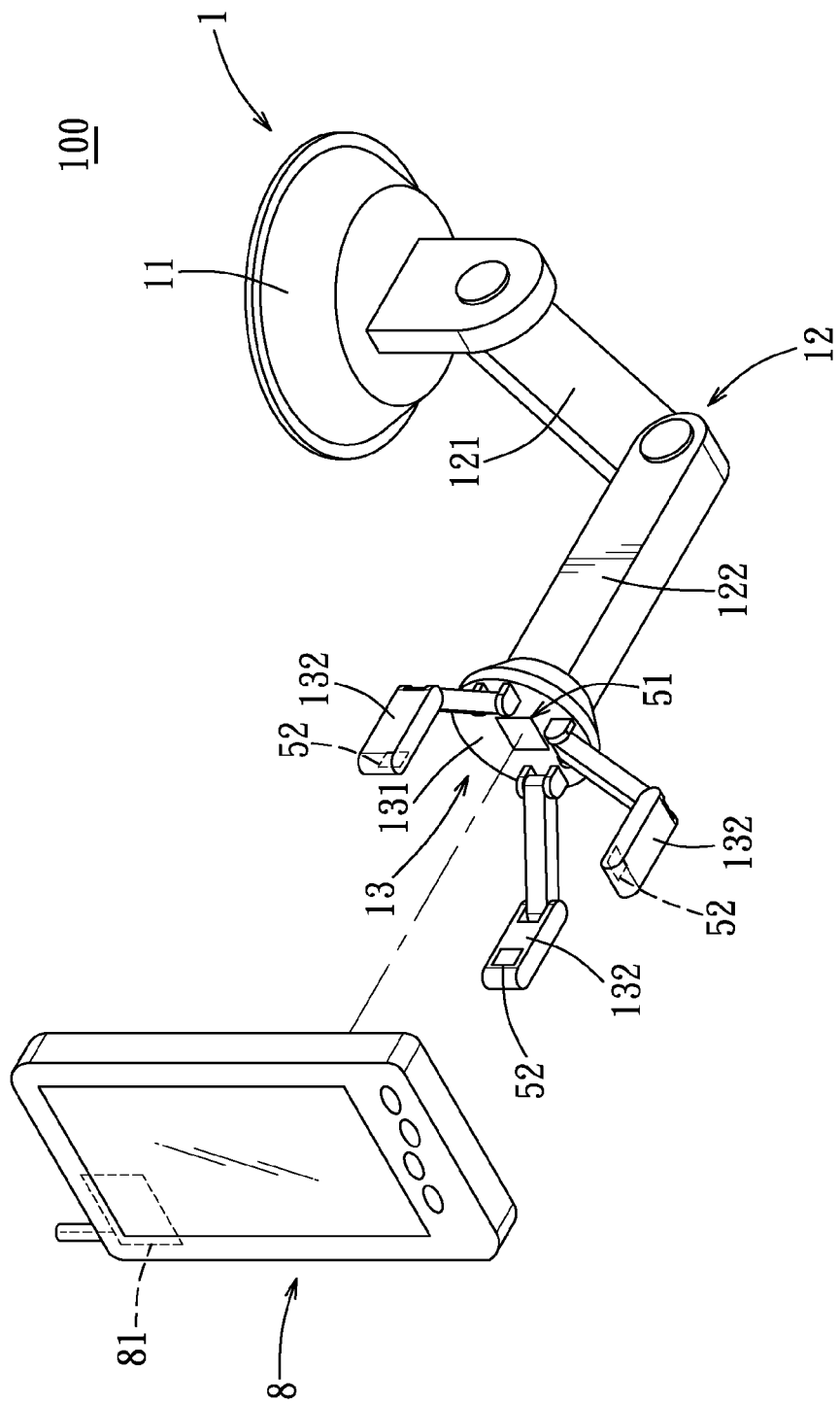
FIG. 2 is a perspective view of a first embodiment of a holder device according to the invention.
Figure 3:
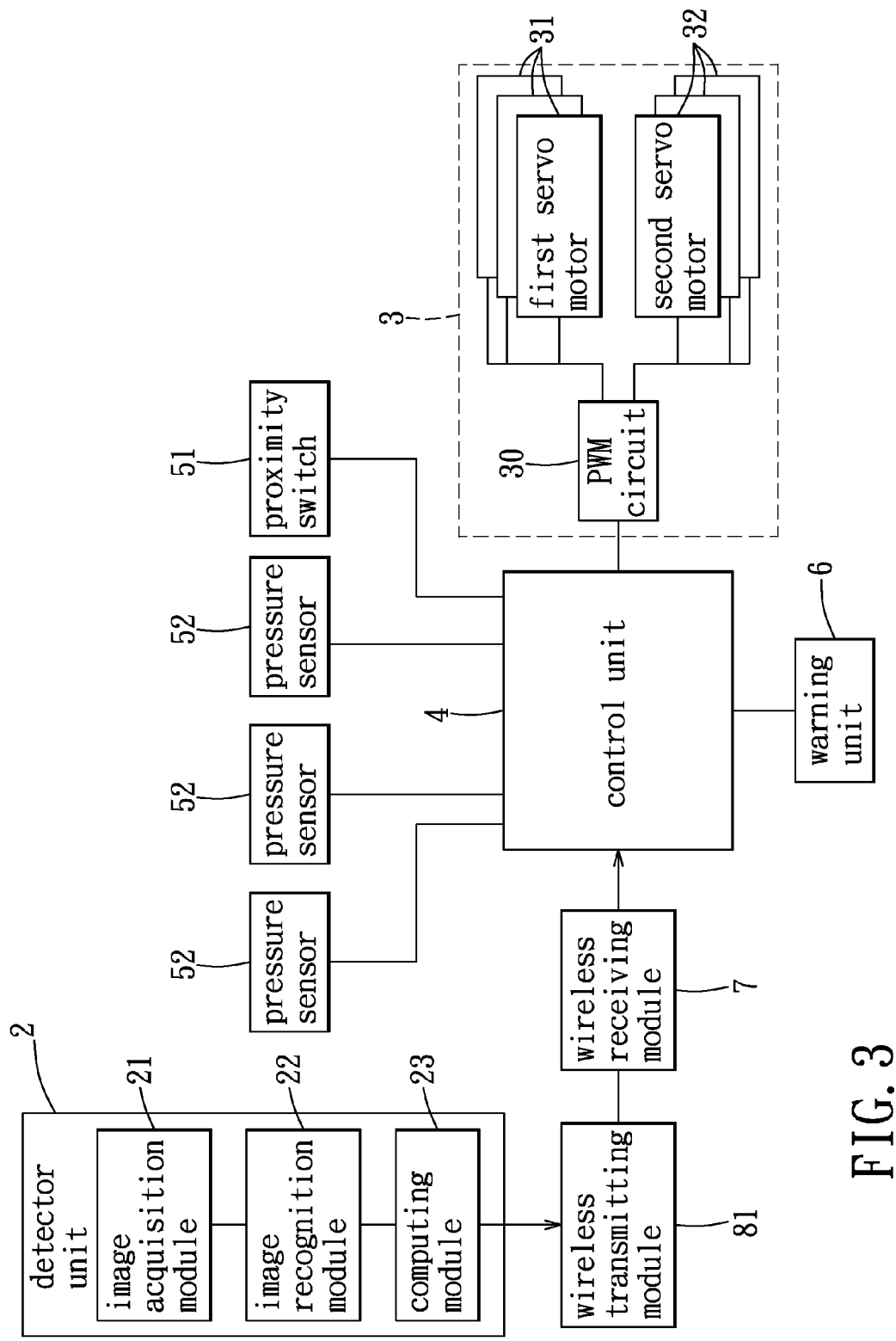
FIG. 3 is a block diagram illustrating connections among various components of the first embodiment.

As shown in FIGS. 2 and 3, the first embodiment of a holder device 100 according to the present invention is capable of automatically adjusting orientation of an electronic device 8 placed thereon (e.g., an in-vehicle navigation device). The holder device 100 comprises a holder body 1, a detector unit 2, a torque unit 3, a control unit 4, a proximity switch 51, a plurality of pressure sensors 52 and a warning unit 6.

The holder device 1 includes a base 11, a movable arm set 12 pivoted to the base 11, and a fastening seat 13 for placing the electronic device 8 thereon. The movable arm set 12 includes a first movable arm 121 pivoted to the base 11, and a second movable arm 122 pivoted to the first movable arm 121. The fastening seat 13 includes a palm part 131 pivoted to one end of the second movable arm 122, and a plurality of claw parts 132. In this embodiment, the movable arm set 12 may be configured to pivot in various ways, including using joints that can rotate 360 degrees in a plane, or universal ball joints. Each of the claw parts 132 has a plurality of knuckles, and adjacent knuckles are connected by a joint.

In this embodiment, the torque unit 3 includes a pulse width modulation (PWM) circuit 30 and a plurality of first servo motors 31, and is configured to receive electricity from an external electric source, such as a battery or an in-vehicle lighter socket. The first servo motors 31 are disposed at pivot joints of the movable arm set 12. (that is, pivot joint of the first movable arm 121 and the base 11, pivot joint of the second movable arm 122 and pivot joint of the first movable arm 121, and the fastening seat 13 and the second movable arm 122). The first servo motors 31 provide power for driving pivoting movement of the movable arm set 12. Certainly, motors other than the servo motor, such as step motors, may be used so long as they are capable of providing power for driving pivoting movement.

The following paragraph describes the technique used to position the electronic device 8 in detail. The proximity switch 51 is disposed at the palm part 131 and is electrically connected to the control unit 4, and the pressure sensors 52 are disposed at surfaces of the claw parts 132 that face each other and are electrically connected to the control unit 4. The torque unit 3 further includes a plurality of second servo motors 32 that are disposed at pivot joints of the claw parts 132 and that are electrically connected to the control unit 4. Upon sensing that the electronic device 8 is proximate to the palm part 131, the proximity switch 51 transmits an activating signal to the control unit 4. The control unit 4 responds to the activating signal by activating the second servo motors 32 for moving the claw parts 132 toward each other for holding the electronic device 8. When pressure values detected by the pressure sensors 52 reach a preset pressure value, the control unit 4 deactivates the second servo motors 32 to stop further movement of the claw parts 132. At this time, the electronic device 8 is positioned by the palm part 131 and the claw parts 132.

The following paragraphs describe the technique used to automatically adjust orientation in detail. In this embodiment, the detector unit 2 uses an image detecting technique, and is disposed at the electronic device 8. The detector unit 2 includes an image acquisition module 21, an image recognition module 22 connected to the image acquisition module 21, and a computing module 23 connected to the image recognition module 22. The image acquisition module 21 is capable of acquiring an original image of the user within a preset detection range. The image recognition module 22 receives the original image from the image acquisition module 21 and recognizes a target image conforming to a preset facial definition from the original image. The aforementioned facial definition, for example, can be defined as an object with a substantially circular contour and two eyes located thereon, or other equivalent schemes.

The computing module 23 of the detector unit 2 is operable to generate user-associated position information from the original image and the target image. To be specific, assume that the image acquisition module 21 is located above a display of the electronic device 8, and a face is recognized in the left half of the original image (that is, the target image is located in the left half of the original image). This scenario indicates that the electronic device 8 should be oriented toward the left, which will be included in the user-associated position information.

In this embodiment, the electronic device 8 includes a wireless transmitting module 81 for transmitting the user-associated position information, and the holder device 100 further comprises a wireless receiving module 7 electrically connected to the control unit 4 that is disposed at the base 11 of the holder body 1, for receiving the user-associated position information and providing the user-associated position information to the control unit 4. Upon receiving the user-associated position information, the control unit 4 generates a control command corresponding to the position information and transmits the control command to the PWM circuit 30. The PWM circuit 30 then generates PWM signal sent to the first servo motors 31, so as to control the first servo motors 31 to move the movable arm set 12 for adjusting orientation of the electronic device 8.

When the aforementioned orientation adjustment is complete, the image acquisition module 21 of the detector unit 2 subsequently acquires another original image, which is used by the image recognition module 22 to recognize another target image and in turn used to generate the user-associated position information by the computing module 23. If the user-associated position information indicates that no further adjustment is required, (that is, the target image is located in the middle of the original image, and orientation of the electronic device 8 corresponds to the user-associated position information), the control unit 4 stores a record of adjusted orientation of the electronic device 8 therein, the record indicating a reference point position (e.g., a point of origin or a previously recorded point) and motion track information of each of the first servo motors 31.

Figure 4:
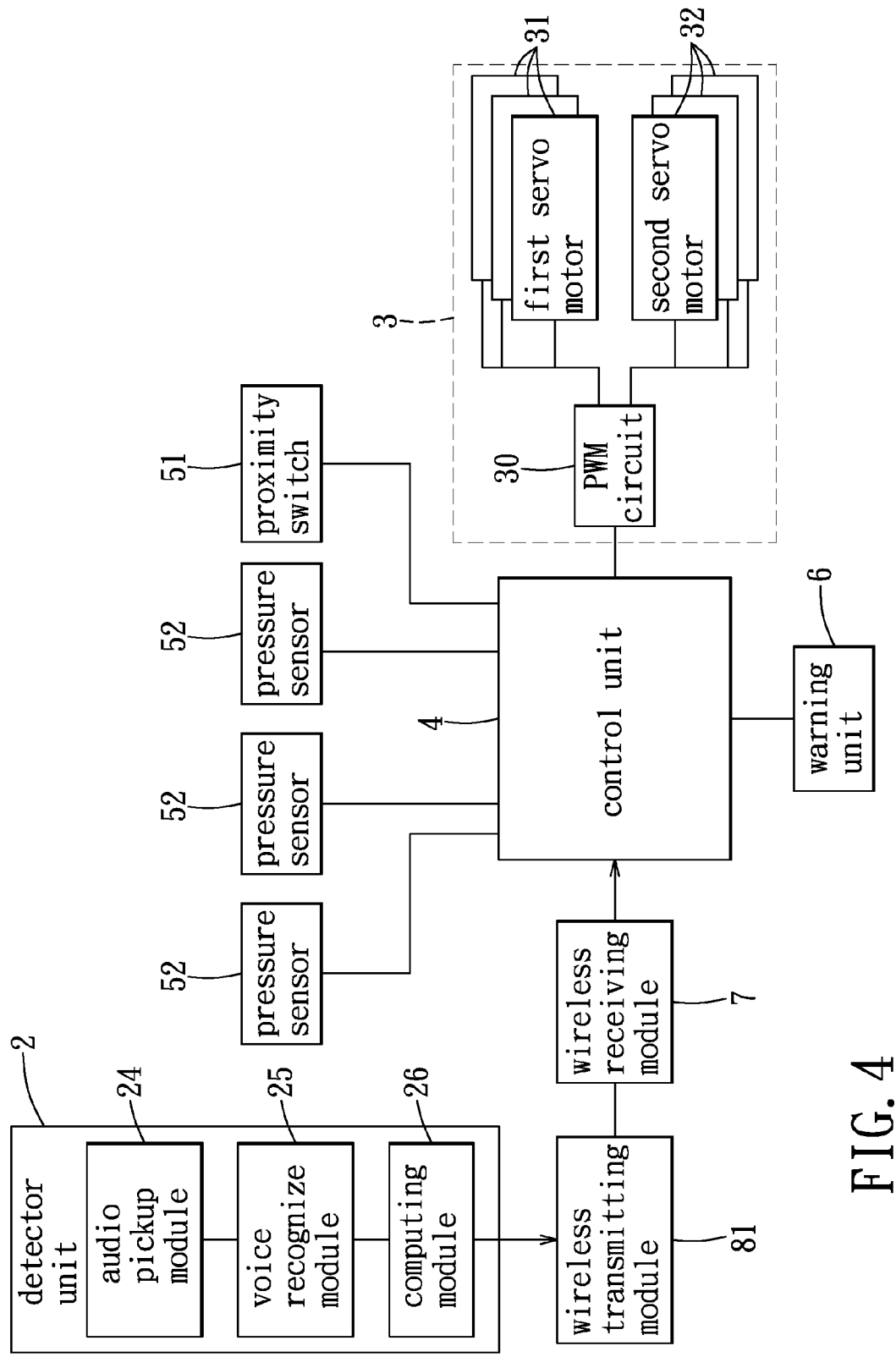
FIG. 4 is a block diagram illustrating connections among various components of the first embodiment, where a detector module of the holder device utilizes a voice recognition technique.

It is worth noting that the technique used by the detector unit 2 is not limited to the image recognition technique described above. A voice recognition technique is also applicable in this invention, along or cooperating with the image recognition technique. Further referring to FIG. 4, when the voice recognition technique is used, the detector unit 2 includes an audio pickup module 24 for acquiring an original audio signal, a voice recognition module 25 connected to the audio pickup module 24, and a computing module 26 connected to the voice recognition module 25. The voice recognition module 25 receives the original audio signal from the audio pickup module 24 and recognizes a target voice source from the original audio signal.

In one configuration, the audio pickup module 24 includes an array of microphones, and acquires the original audio signal from three different positions (e.g., the left, front and right of the electronic device 8 or the holder device 100). The voice recognition module 25 identifies one of the positions having a comparatively large volume of the original audio signal, and the computing module 26 generates the user-associated position information with reference to one of the positions identified by the voice recognition module 25.

In another configuration, the voice recognition module 25 stores a plurality of command audio files, such as "to the left", "up", and "move forward", for comparison with the original audio signal from the audio pickup module 24 (in this case, the original audio signal is the voice command given by the user). The computing module 26 subsequently generates the user-associated position information with reference to a comparison result from the voice recognition module 25. The control unit 4 in turn controls the first servo motors 31 to adjust orientation of the electronic device 8 in a manner similar to that described hereinabove.

In this embodiment, the image acquisition module 21 is configured to acquire original images in succession, and the computing module 23 is capable of recognizing consecutive ones of the target image for comparison with a preset asleep definition. Upon recognizing from the consecutive ones of the target image that the user has fallen asleep (that can be indicated by identifying conditions such as frequency of the eyes of the user being closed conforms with a predetermined frequency, the head of the user has instant swaying movement or the head of the user has moved out of the detection range of the image acquisition module 21), the computing module 23 transmits a warning signal to the control unit 4. In response to the warning signal, the control unit 4 transmits a control signal to the warning unit 6 for generating an audible warning so as to wake the user up for safety concern. Software that drives the image recognition module 22 and the computing module 23 needs to be installed on and executed by the electronic device 8 so as to make the holder device 100 fully functional.

Figure 5:
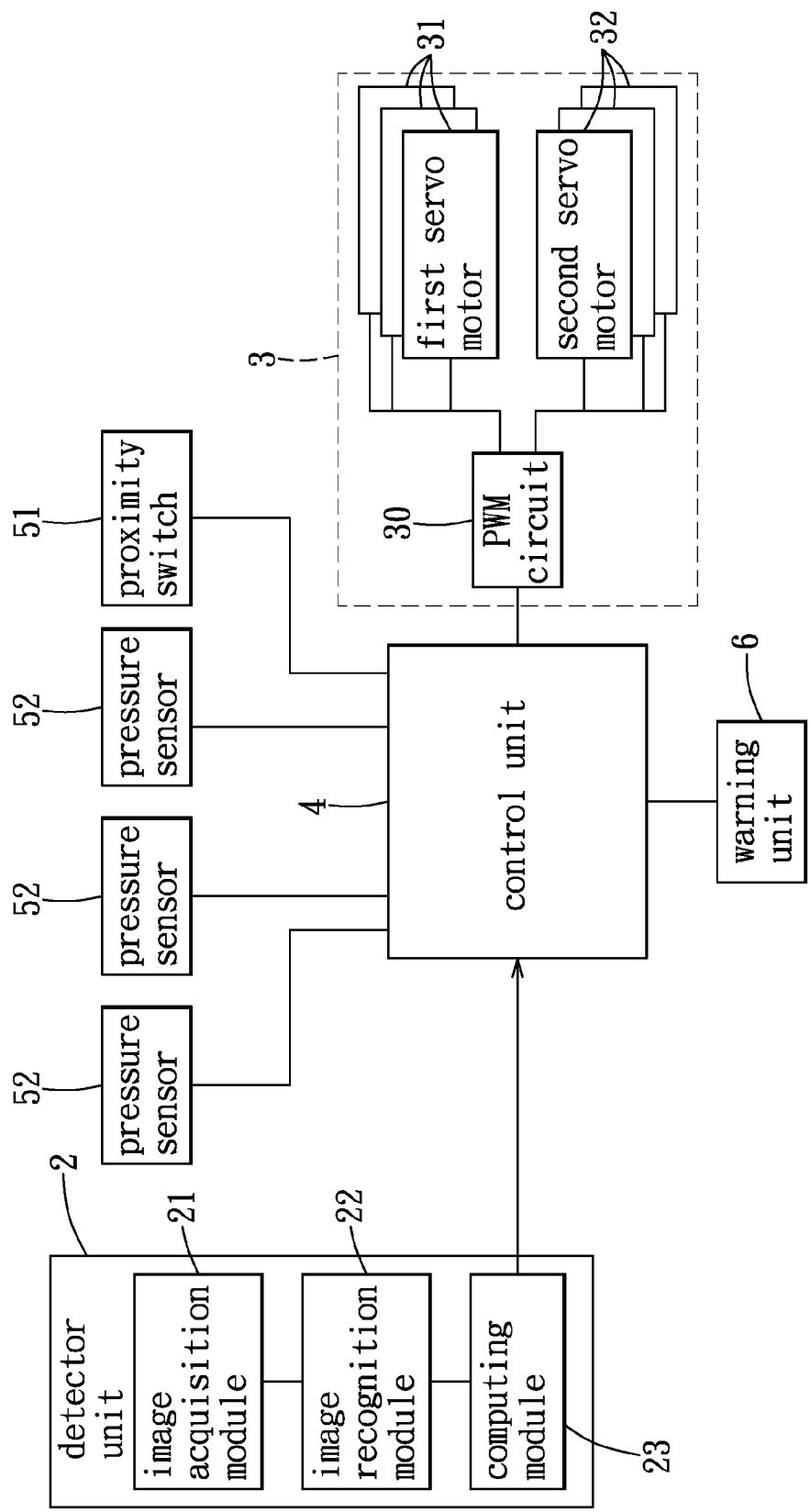
FIG. 5 is a block diagram illustrating connections among various components of a second embodiment.

As shown in FIGS. 2 and 5, the second embodiment of the holder device 100 according to the present invention has a structure similar to that of the first embodiment. The main difference between this embodiment and the previous embodiment resides in the configuration of the detector unit 2, which is disposed at the holder body 1 instead of the electronic device 8, and which is electrically connected to the control unit 4. The image acquisition module 21 is disposed at the ends of the claw parts 132 of the fastening seat 13, and the image recognition module 22 and the computing module 23 are contained in the base 11. Therefore, the wireless transmitting module 81 and the wireless receiving module 7 are no longer required, and no software is needed to be installed on the electronic device 8 to drive the image recognition module 22 and the computing module 23. The second embodiment has the same advantages as those of the first embodiment.

Figure 6:
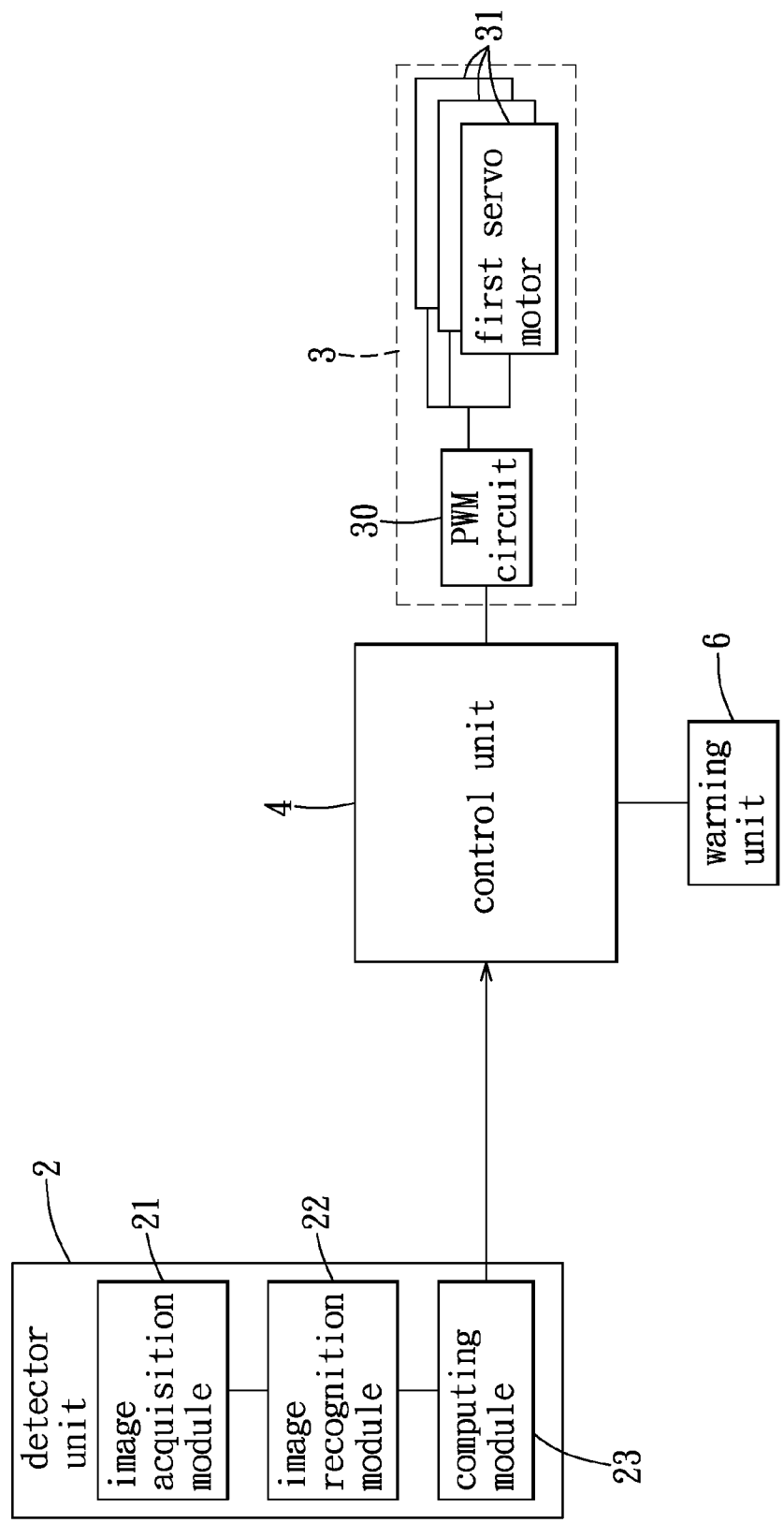
FIG. 6 is a block diagram illustrating connections among various components of a third embodiment.

As shown in FIG. 6, the third embodiment of the holder device 100 according to the present invention has a structure similar to that of the first embodiment. The main difference between this embodiment and the first embodiment resides in the following. The holder device 100 does not comprise the proximity switch 51 and the pressure sensors 52, and the fastening seat 13 of the holder body 1 uses another mechanism to hold the electronic device 8 (such as using bolts or configuring the holder body 1 so as to engage the electronic device 8). Accordingly, the palm part 131, the claw parts 132 and the second servo motors 32 can be omitted. This embodiment is suitable for a display screen hung in a mall. Upon detecting a user watching the display screen, the detector unit 2 transmits the user-associated position information to the control unit 4, which controls the torque unit 3 to move the movable arm set 12 for adjusting orientation of the display screen correspondingly to the user, allowing the user to view the display screen conveniently. The third embodiment has the same advantages as those of the first embodiment.

To sum up, the holder device 100 of this invention controls pivoting movement of the movable arm set 12 based upon the user-associated position information obtained from a recognition technique, thereby adjusting orientation of the electronic device 8 placed thereon automatically.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A holder device capable of automatically adjusting orientation of an electronic device placed thereon based upon position of a user, the electronic device serving as an in-vehicle navigation device, said holder device comprising:
   a holder body including a base, a movable arm set pivoted to said base, and a fastening seat for placing the electronic device thereon;
   a torque unit that is disposed at pivot joints of said movable arm set and that provides power for driving pivoting movement of said movable arm set; and
   a detector unit to be disposed at the electronic device for providing user-associated position information; and
   a control unit disposed to receive the user-associated position information from said detector unit and configured to generate a control command corresponding to the position information and to transmit the control command to said torque unit so as to control said torque unit to move said movable arm set for adjusting orientation of the electronic device placed on said fastening seat;
   wherein:
   said fastening seat includes a palm part and a plurality of claw parts;
   said holder device further comprises a proximity switch disposed at said palm part and electrically connected to said control unit, and a plurality of pressure sensors disposed at said claw parts and electrically connected to said control unit;
   said torque unit includes servo motors disposed at pivot joints of said claw parts and electrically connected to said control unit;
   said proximity switch transmits an activating signal to said control unit upon sensing that the electronic device is proximate to said palm part;
   said control unit responds to the activating signal by activating said servo motors for moving said claw parts toward each other for holding the electronic device; and
   said control unit deactivates said servo motors to stop further movement of said claw parts when pressure values detected by said pressure sensors reach a preset pressure value.

2. The holder device as claimed in claim 1, wherein said detector unit includes:
   an acquisition module for acquiring user-associated information;
   a recognition module connected to said acquisition module, said recognition module receiving the user-associated information from said acquisition module and recognizing target information conforming to a preset definition from the user-associated information; and
   a computing module connected to said recognition module and operable to generate the user-associated position-information from the target information.

3. The holder device as claimed in claim 1, wherein said detector unit includes:
   an image acquisition module for acquiring an original image of the user;
   an image recognition module connected to said image acquisition module, said image recognition module receiving the original image from said image acquisition module and recognizing a target image conforming to a preset facial definition from the original image; and
   a computing module connected to said image recognition module and operable to generate the user-associated position-information from the original image and the target image.

4. The holder device as claimed in claim 3, further comprising a warning unit connected to said control unit, said computing module of said detector unit recognizing consecutive ones of the target image for comparison with a preset asleep definition, said computing module transmitting a warning signal to said control unit upon recognizing from the consecutive ones of the target image that the user has fallen asleep, said control unit transmitting a control signal to said warning unit for generating an audible warning in response to the warning signal.

5. The holder device as claimed in claim 4, wherein said computing module transmits the warning signal upon identification of any one of the following conditions:
   frequency of the eyes of the user being closed conforms with a predetermined frequency;
   instant swaying movement of the head of the user; and
   the head of the user has moved out of a detection range of said image acquisition module.

6. The holder device as claimed in claim 3, wherein said movable arm set includes a plurality of movable arms that are pivoted together, and said torque unit includes motors corresponding to said movable arms.

7. The holder device as claimed in claim 6, wherein said torque unit includes a pulse width modulation (PWM) circuit for receiving the control command and for transmitting PWM signals to said motors, and wherein said control unit stores a record of adjusted orientation of the electronic device therein, the record indicating a reference point position and motion track information of each of said motors.

8. The holder device as claimed in claim 6, wherein said torque unit is configured to receive electricity from an external electric source.

9. The holder device as claimed in claim 6, the electronic device including a wireless transmitting module for transmitting the user-associated position information, wherein said holder device further comprises a wireless receiving module electrically connected to said control unit for receiving the user-associated position information and providing the user-associated position information to said control unit.

10. The holder device as claimed in claim 1, wherein said detector unit including includes:
   an audio pickup module for acquiring an original audio signal;
   a voice recognition module connected to said audio pickup module, said voice recognition module receiving the original audio signal from said audio pickup module and recognizing a target voice source from the original audio signal; and
   a computing module connected to said voice recognition module and operable to generate the user-associated position information from the original audio signal and the target voice source.

11. The holder device as claimed in claim 10, wherein:
   said audio pickup module is configured to acquire the original audio signal from three different positions;
   said voice recognition module is configured to identify one of the positions having a comparatively large volume of the original audio signal; and
   said computing module is configured to generate the user-associated position information with reference to said one of the positions identified by said voice recognition module.

12. The holder device as claimed in claim 10, wherein said voice recognition module stores a plurality of command audio files for comparison with the original audio signal from said audio pickup module, and said computing module is configured to generate the user-associated position information with reference to a comparison result from said voice recognition module.

13. The holder device as claimed in claim 1, the electronic device including a wireless transmitting module for transmitting the user-associated position information, wherein said holder device further comprises a wireless receiving module electrically connected to said control unit for receiving the user-associated position information and providing the user-associated position information to said control unit.

* * * * *